United States Patent
Tsuda et al.

(10) Patent No.: US 7,564,645 B2
(45) Date of Patent: Jul. 21, 2009

(54) ROTATING DISK STORAGE DEVICE WITH MOUNTING STRUCTURE AND ENHANCED FIXING MECHANISM

(75) Inventors: Shingo Tsuda, Kanagawa (JP); Mutsuro Ohta, Kanagawa (JP); Akira Morita, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 403 days.

(21) Appl. No.: 11/048,409

(22) Filed: Jan. 31, 2005

(65) Prior Publication Data

US 2005/0180045 A1 Aug. 18, 2005

(30) Foreign Application Priority Data

Feb. 13, 2004 (JP) ............................. 2004-036141

(51) Int. Cl.
G11B 5/012 (2006.01)
(52) U.S. Cl. .................................. 360/97.01
(58) Field of Classification Search ............. 360/97.01, 360/97.02, 97.03, 98.01
See application file for complete search history.

(56) References Cited

U.S. PATENT DOCUMENTS

| 5,004,207 | A | * | 4/1991 | Ishikawa et al. ............ 248/632 |
| 5,243,495 | A | * | 9/1993 | Read et al. .................. 361/685 |
| 5,315,466 | A | | 5/1994 | Nishimoto et al. |
| 5,703,734 | A | * | 12/1997 | Berberich et al. ........ 360/97.02 |
| 6,034,841 | A | | 3/2000 | Albrecht |
| 6,097,608 | A | * | 8/2000 | Berberich et al. ........... 361/752 |
| 6,283,438 | B1 | * | 9/2001 | Shimada et al. ............. 248/694 |
| 6,324,054 | B1 | * | 11/2001 | Chee et al. .................. 361/685 |
| 6,347,023 | B1 | | 2/2002 | Suwa |
| 6,704,161 | B1 | * | 3/2004 | Pham et al. .............. 360/97.02 |
| 6,735,043 | B2 | * | 5/2004 | Bernett et al. ............ 360/97.01 |
| 2004/0150909 | A1 | * | 8/2004 | Kimura et al. ........... 360/97.01 |

FOREIGN PATENT DOCUMENTS

| JP | 04-345974 | 12/1992 |
| JP | 06-236660 | 8/1994 |
| JP | 2001-325777 | 11/2001 |

* cited by examiner

*Primary Examiner*—David D Davis
(74) *Attorney, Agent, or Firm*—Townsend and Townsend and Crew LLP; Darren Gold (57) ABSTRACT

Embodiments of the invention provide a rotating disk storage device which has a simple mounting structure facilitating mounting thereof to a host system and is reduced in noise. In one embodiment, the rotating disk storage device includes a magnetic disk, a voice coil motor for driving a head suspension assembly having a head for reading data from the magnetic disk, a base for rotatably supporting the magnetic disk and housing the head suspension assembly and the voice coil motor, a frame having fixing areas at which the base is fixed, the fixing areas being joined to the base via an adhesive double coated tape.

10 Claims, 8 Drawing Sheets

AFTER ASSEMBLY

BEFORE ASSEMBLY

ROTATING DISK STORAGE DEVICE WITH MOUNTING STRUCTURE AND ENHANCED FIXING MECHANISM

CROSS-REFERENCES TO RELATED APPLICATIONS

This application claims priority from Japanese Patent Application No. JP2004-036141, filed Feb. 13, 2004, the entire disclosure of which is incorporated herein by reference.

BACKGROUND OF THE INVENTION

The present invention relates to a mounting structure for a rotating disk storage device such as a magnetic disk drive and an magnetooptical disk drive, which is to be used for mounting the rotating disk storage device to a host system, and, more specifically, to a mounting structure for a rotating disk storage device having a base formed by pressing.

The magnetic disk drive is constituted mainly of a head disk assembly (hereinafter referred to as HDA in this specification). In order to house a magnetic disk, an actuator head suspension assembly, a spindle motor, other electrical components, and the like in a clean air environment, the HDA is sealed in such a fashion that an opening of a base for housing the above components is covered with a cover. Therefore, assembly of the magnetic disk drive is performed in a clean room. An actuator which supports a head for reading/writing data from/to the rotating magnetic disk and positions the head at a predetermined position is used as the actuator head suspension assembly of the magnetic disk drive. A driving mechanism of the actuator is a voice coil motor (hereinafter referred to as VCM in this specification) having a coil, a magnet, and a yoke.

Reductions in cost and thickness of the magnetic disk drive are strongly demanded for reasons of a further increase in implementation of the magnetic disk drive to personal digital assistants and so forth. For the cost reduction, a method of forming the base for housing the magnetic disk and the like by pressing a metal plate has been proposed in place of casting for forming an aluminum dye cast (see, for example, Japanese Patent Laid-open No. Hei 9-120669 and Japanese Patent Laid-open No. Hei 1-248386). For the thickness reduction, a method of using the base as the yoke of the VCM has been proposed. See, for example, Japanese Patent Laid-open No. Hei 4-345974, Japanese Patent Laid-open No. Hei 6-236660, Japanese Patent Laid-open No. 2001-325777, Japanese Patent Laid-open No. Hei 5-41044, Japanese Patent Laid-open No. Hei 11-102580, and U.S. Pat. No. 6,034,841.

BRIEF SUMMARY OF THE INVENTION

Japanese Patent Laid-open No. Hei 9-120669 and Japanese Patent Laid-open No. Hei 1-248386 disclose the technique of mounting a frame to a base made from a metal plate. However, a few problems are raised when the technique is applied to a magnetic disk drive. As described in the foregoing, the HDA sealed by the base and the cover are assembled in the clean room when manufacturing the magnetic disk drive. Accordingly, when the HDA is conveyed out of the clean room, the holes for joining the base and the cover to each other using screws cannot be left as they are. Therefore, when the method of fixing the frame to the base by screw joining is employed, a method of fixing the frame to the base in the clean room and then sealing the joining portions is considered.

It is necessary to keep materials used for forming the magnetic disk which is conveyed into the clean room to be clean and free from dust by cleaning the materials with super pure water in advance of the conveyance. Also, it is necessary to strictly prevent the materials from generating dust in the clean room. Accordingly, when joining the frame to the base by way of the holes on the base in the clean room, the frame must satisfy requirements of the materials to be conveyed into the clean room. The frame is usually formed by pressing a galvanized steel plate for the purposes of cost reduction and so forth. If an edge of the frame is left as it is cut, chips and rust can be generated due to such edge and, therefore, such frame cannot possibly be conveyed into the clean room. Consequently, processing on the edge, such as plating after the pressing, may be required to undesirably increase the cost.

Also, although a method of welding a nut having closed edge to each of the holes on the base for the screw joining is known, such method entails an increase in process step and requires processing on the welded portions. Also, a method of forming a flange on each of the joining portions of the base and the cover and then forming on the flange a screw hole for fixation to the frame or the host system may be considered. However, such method causes an increase in size only of the flange to fail to satisfy magnetic disk form factors which are in conformity with the models of 2.5-model which is 2.5-inch (about 5.08 cm) type and 3.5-model which is 3.5-inch (about 8.89 cm) type, thereby complicating the pressing process. Since the frame increases a thickness and a weight of the magnetic disk drive, it is necessary to add functions other than the fixation to the host system to the frame.

A feature of the present invention is to provide a rotating disk drive having a base formed by pressing, such as a magnetic disk drive and a magnetooptical disk drive, with a simple structure for mounting to a host system. Another object of the invention is to provide a rotating magnetic disk storage device which achieves a thickness reduction of the device and is free from an increase in form factors. Yet another object of the invention is to provide a rotating disk storage device which is reduced in noise.

In accordance with a first embodiment of the present invention, there is provided a rotating disk storage device comprising: a rotating disk recording medium; a voice coil motor used for driving a head suspension assembly having a head for reading data from the rotating disk recording medium; a base for housing the rotating disk recording medium, the head suspension assembly, and the voice coil motor; and a frame having a fixing area at which the base is fixed, the fixing area being joined to the base via a vibration damping material.

In the first embodiment, the base and the frame sandwich the vibration damping material therebetween to achieve a sandwich structure, thereby functioning as a damping material which achieves a vibration suppression effect. An adhesive double coated tape may be used as the vibration damping material.

In accordance with a second embodiment of the invention, there is provided a rotating disk storage device comprising: a rotating disk recording medium; a head suspension assembly provided with a head for reading data from the rotating disk recording medium; a voice coil motor including a voice coil rotating integrally with the head suspension assembly and used for driving the head suspension assembly; a base made from a magnetic material, the base housing the rotating disk recording medium, the head suspension assembly, and the voice coil motor; and a frame provided with a yoke area including a projected area of a rotating range of the voice coil, the yoke area being made from a magnetic material, wherein the frame is fixed to the base by way of a fixing mechanism.

In the second embodiment, since the frame which is to be fixed to the base is provided with the yoke area, the dedicated yoke may be eliminated from the yoke structure to be used in the VCM, thereby reducing a height of the yoke structure to realize a thickness reduction and reducing the production cost of the VCM. This can be realized also in the first embodiment.

In accordance with a third embodiment of the invention, there is provided rotating disk storage device comprising: a head disk assembly sealed by a cover and a base for housing components including a rotating disk recording medium, a head suspension assembly, and a voice coil motor; a circuit board electrically connected to the head disk assembly; a frame for fixing the head disk assembly to the base; and first fixing mechanism for fixing the base and the frame to each other with a sealed state of the head disk assembly being maintained.

In the third embodiment, since the frame is fixed to the base by way of the first fixing mechanism with the sealed state of the head disk assembly being maintained, it is possible to perform assembly of the frame to be used for the fixation to the host system such as a personal computer as a process step performed separately from the manufacturing process of the head disk assembly which is performed in a clean room.

The present invention enables to provide a simple mounting structure to be used for mounting a rotating disk storage device having a base formed by pressing, such as a magnetic disk drive and a magnetooptical disk drive, to a host system. Further, the invention enables to provide a rotating disk storage device which achieves a thickness reduction and does not increase the number of form factors. Furthermore, the invention enables to provide a rotating disk storage device which is reduced in noise.

BRIEF DESCRIPTION OF THE DRAWINGS

FIGS. 8(*a*) and 8(*b*) are perspective views showing another embodiment of the rotating disk storage device according to the invention.

DETAILED DESCRIPTION OF THE INVENTION

Figure 1:
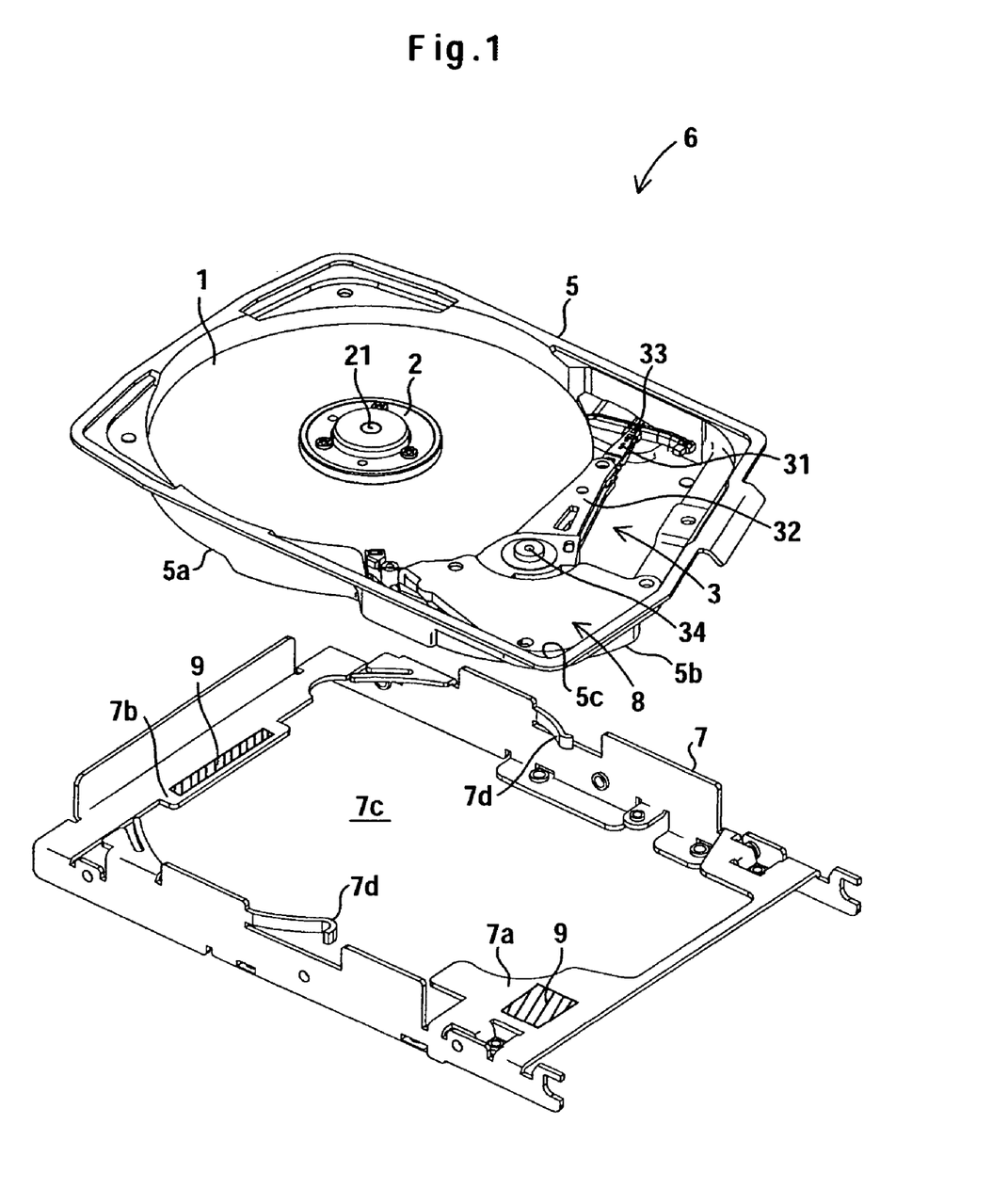
FIG. 1 is a perspective view showing one embodiment of a rotating disk storage device according to the present invention.
Figure 2:
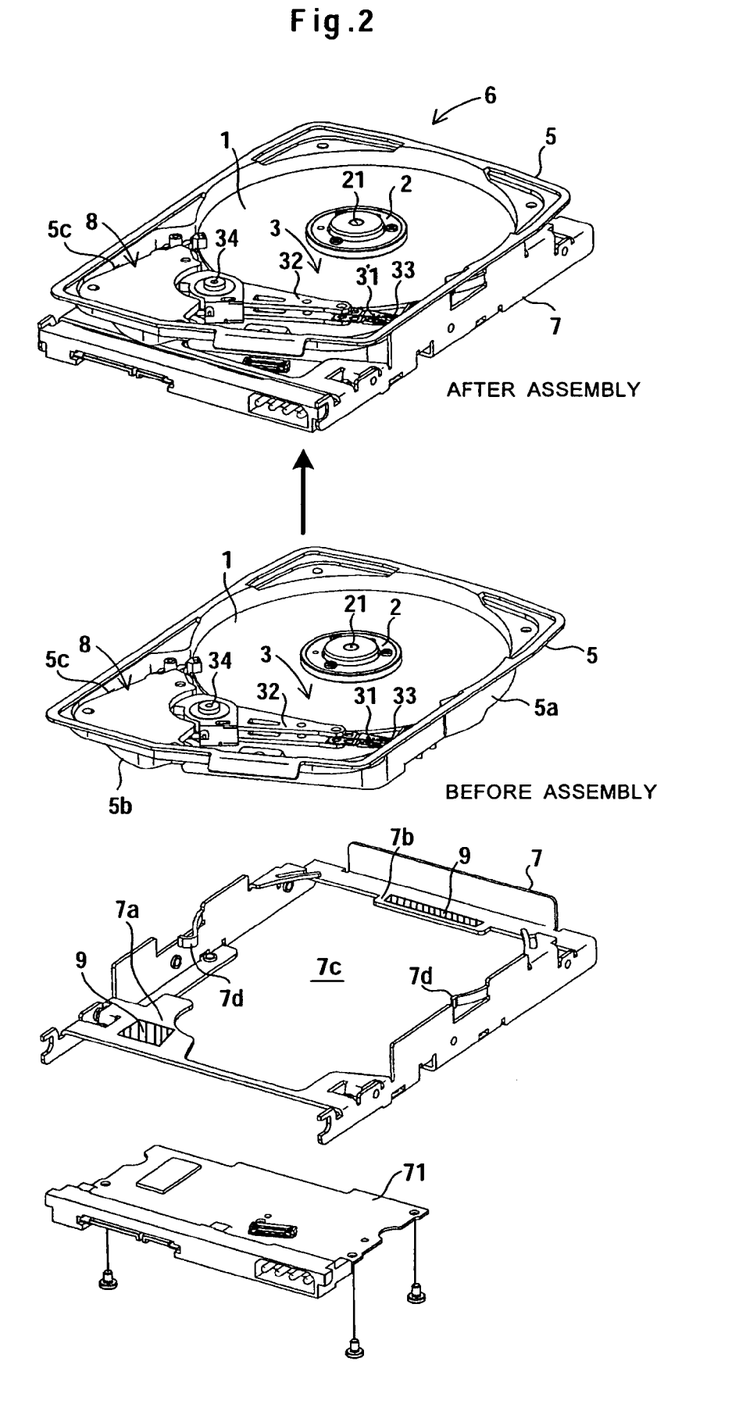
FIG. 2 is a perspective view showing the embodiment of the rotating disk storage device according to the invention.
Figure 3:
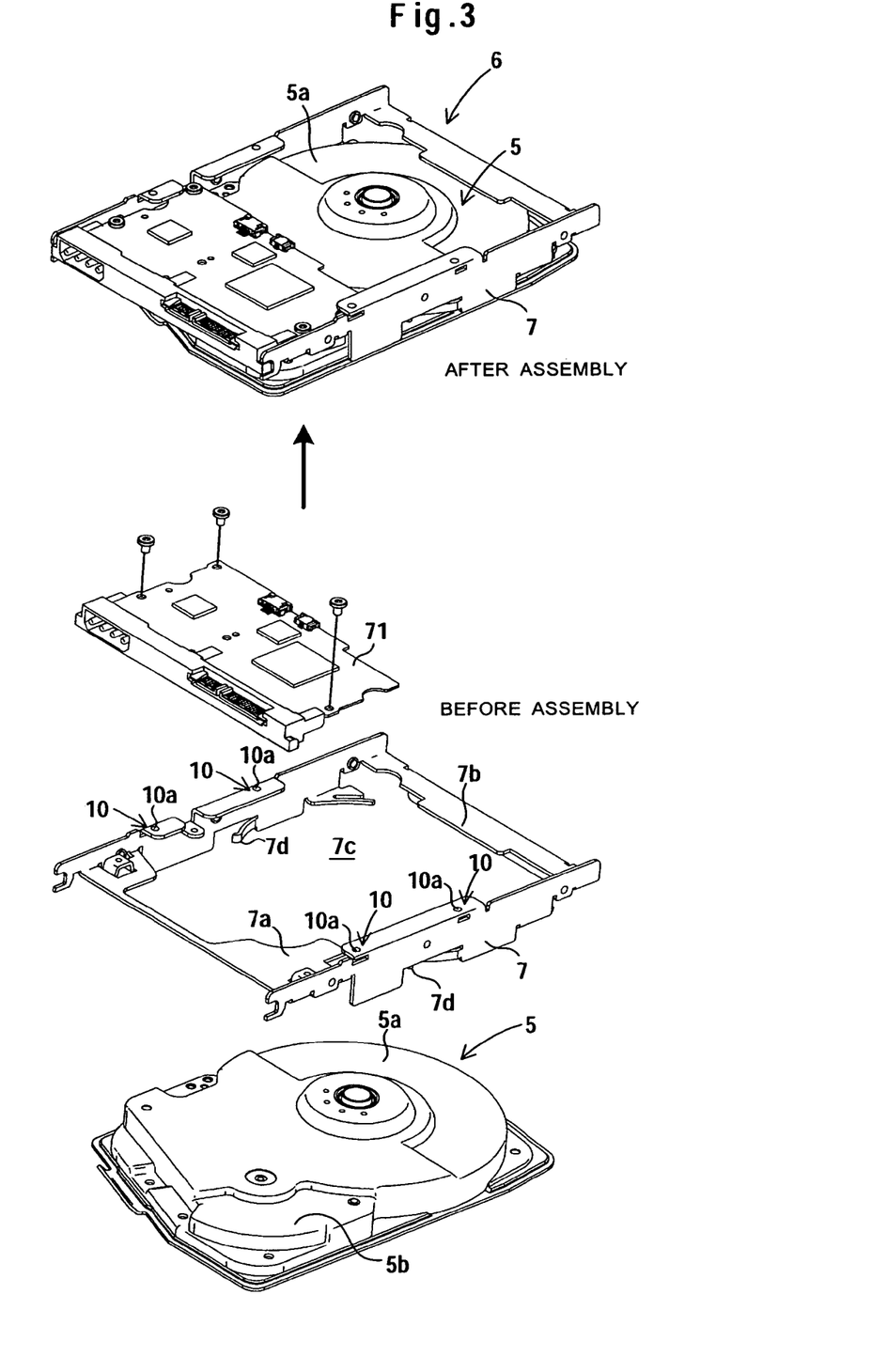
FIG. 3 is a perspective view showing the embodiment of the rotating disk storage device according to the invention.
Figure 4:
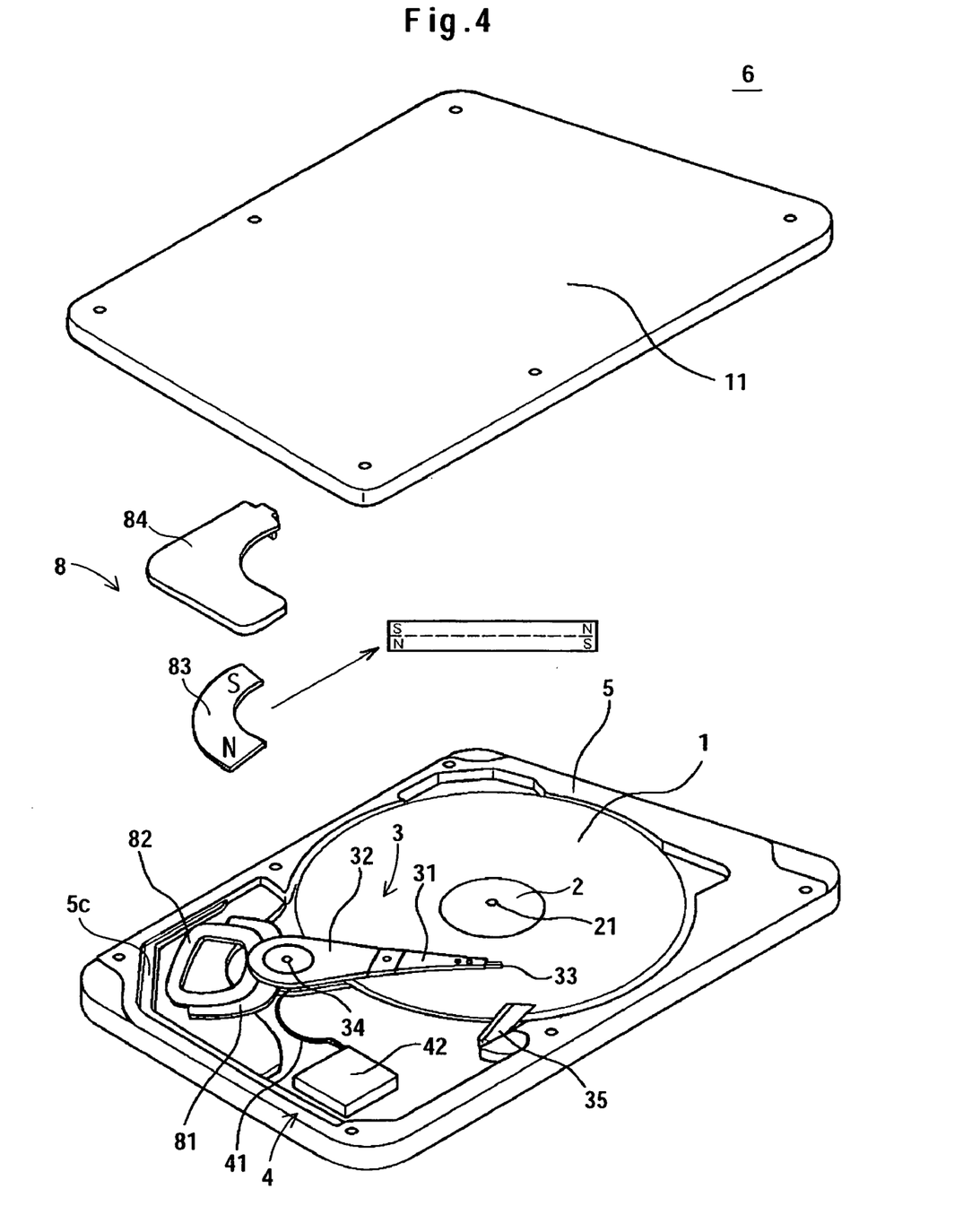
FIG. 4 is a perspective view schematically showing the embodiment of the rotating disk storage device of the invention.
Figure 5:
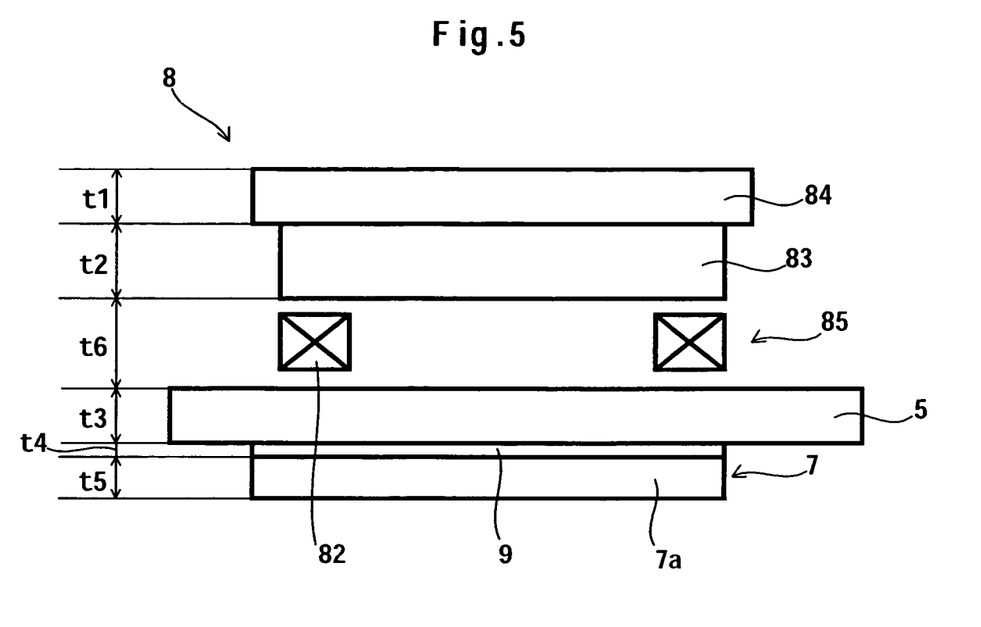
FIG. 5 is a sectional view showing a VCM which is a main component of the rotating disk storage device according to an embodiment of the invention.

Hereinafter, specific embodiments of a rotating disk storage device according to the present invention will be described with reference to the accompanying drawings. FIG. 1 is a perspective view showing a base and a frame which are constituents of a magnetic disk drive. FIG. 2 is a broken perspective view showing a structure of the magnetic disk drive. FIG. 3 is a broken perspective view showing a structure of the magnetic disk drive as viewed from its rear face. FIG. 4 is a partially broken view showing a structure of the magnetic disk drive. FIG. 5 is a sectional view showing a yoke structure of a VCM. Identical constituents are denoted by an identical reference numeral in the drawings of this application.

A magnetic disk drive, which is a rotating disk storage device as one of the embodiments of this invention, is shown in FIGS. 1 to 3. The magnetic disk drive includes a base 5 for housing a magnetic disk 1 (a rotating disk recording medium), a spindle motor 2, an actuator head suspension assembly (hereinafter referred to as AHSA in this specification) 3, and an FPC assembly 4 (see FIG. 4) and an HDA 6 on which a cover 11 (see FIG. 4) for maintaining the base 5 to be a sealed space is mounted. A frame 7 is fixed to the base 5 of the HDA 6, and a circuit board 71 for controlling operation of the magnetic disk drive and data read/write is mounted on the frame 7.

The magnetic disk 1 is fixed to a periphery of a spindle shaft 21 of the spindle motor 2 which is provided upright on the base 5. The AHSA 3 is constituted of a head suspension assembly (hereinafter referred to as HSA in this specification) 31 and an actuator assembly 32. A head 33 for reading data from and/or writing data to the magnetic disk 1 is provided on a tip of the HSA 31. The actuator assembly 32 is constituted of an actuator arm (not shown) for supporting the HSA 31, a bearing of a pivot shaft 34, and a VCM 8.

As shown in FIGS. 4 and 5, the VCM 8 is constituted of a coil support 81, a voice coil 82 held by the coil support 81, a voice coil magnet 83, an upper yoke 84, and a lower yoke area 7*a* formed on a part of the frame 7 which will be described later in this specification. The upper yoke 84 is made from steel having a soft magnetism, such as a cold rolled steel plate (SPCC) which is a ferromagnetic material with plating. The voice coil magnet 83 made from a permanent magnet is fixed to a back face of the upper yoke 84 with an adhesive. The base 5 has one of its faces opposed to a top face of the voice coil magnet 83. A yoke gap 85 is defined between the opposing face of the base 5 and the top face of the voice coil magnet 83. In addition, as the adhesive, LOCTITE 366 (product of Henkel Loctite Corporation) may suitably be used.

The voice coil magnet 83 is integrally formed and has both of the N pole and the S pole on a surface contacting the space. The poles are segmented from each other by a transition area. Magnetic poles opposite to the poles of the surface are formed on a back face near the lower yoke area 7*a* under the frame 7 of the voice coil magnet 83.

A ramp 35 is provided in the vicinity of the magnetic disk 1. In the case of stopping the rotation of the magnetic disk 1, the ramp 35 retracts the head 33 by providing a sliding surface to a merge lip (not shown) formed at the tip of the HSA 31 (see FIG. 4).

An FPC assembly 4 has a structure that a signal line from the head 33 of the HSA 31 is connected to a semiconductor device 42 via a flexible cable 41. The semiconductor device 42 has a known connection structure, and the circuit board 71 mounted on the frame 7 is electrically connected to the semiconductor device 42.

The base 5 for housing the magnetic disk 1, the spindle motor 2, the actuator head suspension assembly 3, and the FPC assembly 4 is constituted of a magnetic disk housing area 5*a* which is a circular depression for housing the magnetic disk 1 and an AHSA housing area 5*b* which is a depression for housing the AHSA 3. The base 5 is made by pressing a cold rolled steel plate (SPCE), a magnetic area, with plating, for example. A step 5C is formed on the base 5 around a position on which the upper yoke 84 is disposed, and the upper yoke 84 is fixed to the step 5*c*.

The frame 7 to be fixed to the base 5 is made by pressing a plated steel plate (SPCE), for example, and is provided with fixing areas 7a and 7b to be fixed to the base 5. Each of the fixing areas 7a and 7b is joined to the base 5 via a vibration damping material 9. An adhesive double coated tape may suitably be used as the vibration damping material 9. As the adhesive double coated tape, No. 5713 manufactured by Nitto Denko Corporation may suitably be used. When the base 5 and the frame 7 are joined to each other via the vibration damping material 9, they function as a damping material having a sandwich structure wherein the vibration damping material 9 is sandwiched therebetween to achieve a vibration suppressing effect. Therefore, noise is reduced. In addition, a rubber excellent in vibration damping property, such as a chloroprene rubber and a butyl rubber, or a polymeric material excellent in vibration damping property, such as ethylene vinyl acetate (EVA), may also be used as the vibration damping material 9. Each of the rubber and the polymeric material can be joined to the fixing areas 7a and 7b between the base 5 and the frame 7 using an adhesive.

The frame 7 has a shape to house the base 5 therein. More specifically, a space area 7c for fitting thereto the magnetic disk housing area 5a and the AHSA housing area 5b of the base 5 is defined in the frame 7. The magnetic disk housing area 5a and the AHSA housing area 5b of the base 5 are fitted in the space area 7c, whereby the base 5 is housed in the frame 7. Therefore, when the frame 7 is fitted to the base 5, a total height is substantially the same as a height of the base 5, thereby achieving a thin plate form of the HDA 6. Also, this structure contributes to improvements in rigidity of the HDA 6.

The frame 7 has a structure to be used for mounting the same on a host system (not shown) such as a personal computer. Examples of the mounting structure may be a joint structure 10 shown in FIG. 3 wherein a screw is used, a fitting guide structure (not shown) which is a known structure for fitting the frame 7 to a guide formed on a bay of the host system, and the like. In the joint structure 10 using screw, a female screw hole 10a is formed on a predetermined position of the frame 7, and a hole (not shown) for inserting therein the screw is formed on the host system. The screw is inserted from the host system side to be screwed in the female screw hole 10a of the frame 7.

Arms 7d each having a leaf spring structure to be used for fitting and positioning the frame 7 to the base 5 are formed on the frame 7. The arms 7d press an outer surface of the magnetic disk housing area 5a of the base 5 thanks to resilience of the leaf spring to achieve the positioning and can be used also as earths. Because the arms 7d have the resilience, the arms 7d will not inhibit the damping function of the sandwich structure of the base 5, the vibration damping material 9, and the frame 7.

The frame 7 is provided with the yoke area 7a which forms a magnetic circuit of the VCM 8 in a projected area of a rotating range of the voice coil of the VCM 8 and functions as the lower yoke when the frame 7 is joined to the base 5 via the vibration damping material 9. Owing to the yoke area 7a of the frame 7, it is possible to eliminate a dedicated yoke from the yoke structure used for the VCM 8; reduce a height of the yoke structure; realize a reduced thickness; and reduce the production cost of the VCM 8. For example, such VCM 8 enables the following dimensions: 2.5 mm of a plate thickness t1 of the upper yoke 84; 2.5 mm of a plate thickness t2 of the voice coil magnet 83; 1.0 mm of a plate thickness t3 of the base 5; 0.2 mm of a thickness t4 of the adhesive double coated tape 9; 1.6 mm of a plate thickness t5 of the frame 7; and 3.5 mm of a gap t6 of a yoke gap 85. With the VCM 8, a magnetic path is formed in such a fashion that a magnetic flux flowing from the N pole on the top face of the voice coil magnet 83 to the yoke gap 85 passes through the lower yoke area 7a of the frame 7 to flow in the S pole on the back face, and a magnetic flux flowing from the N pole on the back face passes through the lower yoke area 7a of the frame 7 and the base 5 to flow in the S pole on the top face via the yoke gap 85. In addition, the adhesive double coated tape 9, which is a non-magnetic material sandwiched between the base 5 and the lower yoke area 7a of the frame 7, does not have an influence on the magnetic path of the VCM 8 because the thickness thereof is 0.2 mm. The structure of the frame 7 is not limited, and any structure may be used so far as a yoke area 7a thereof is a magnetic area.

Since the above-described frame 7 is a component which is separated from the HDA 6, it is no longer necessary to assembly the frame 7 in a clean room. It is necessary to keep the magnetic disk materials conveyed into the clean room to be clean and free from dust by cleaning the materials with super pure water in advance of the conveyance and to strictly prevent the materials from generating dust in the clean room; however, the frame 7 is not required to be assembled in the clean room since it is not the essential constituent for sealing the HDA 6. Since the frame 7 is joined to the base 5 via the vibration damping material 9 with the sealed state of the HDA 6 being maintained, it is unnecessary to consider corrosiveness and cleanness of the frame 7. Further, it is possible to use a cheaper material such as a galvanized steel plate for the frame 7 and to leave an edge of the frame 7 as it is cut. More specifically, since it is possible to use materials to be assembled in the clean room for the base and to use the cheaper material such as the galvanized steel plate for the frame 7, the production cost is reduced as compared with those having a base with a mounting hole and so forth manufactured by aluminum dye cast or by pressing using the materials to be assembled in the clean room. As used herein, the sealed state means not only a perfectly sealed space, but also a state achieved in the case where the HDA 6 is provided with a respiration filter for passing the air from outside when a pressure difference between outside of the HDA 6 and inside of the HDA 6 is generated due to, for example, spindle actuation and a temperature change.

Figure 6:
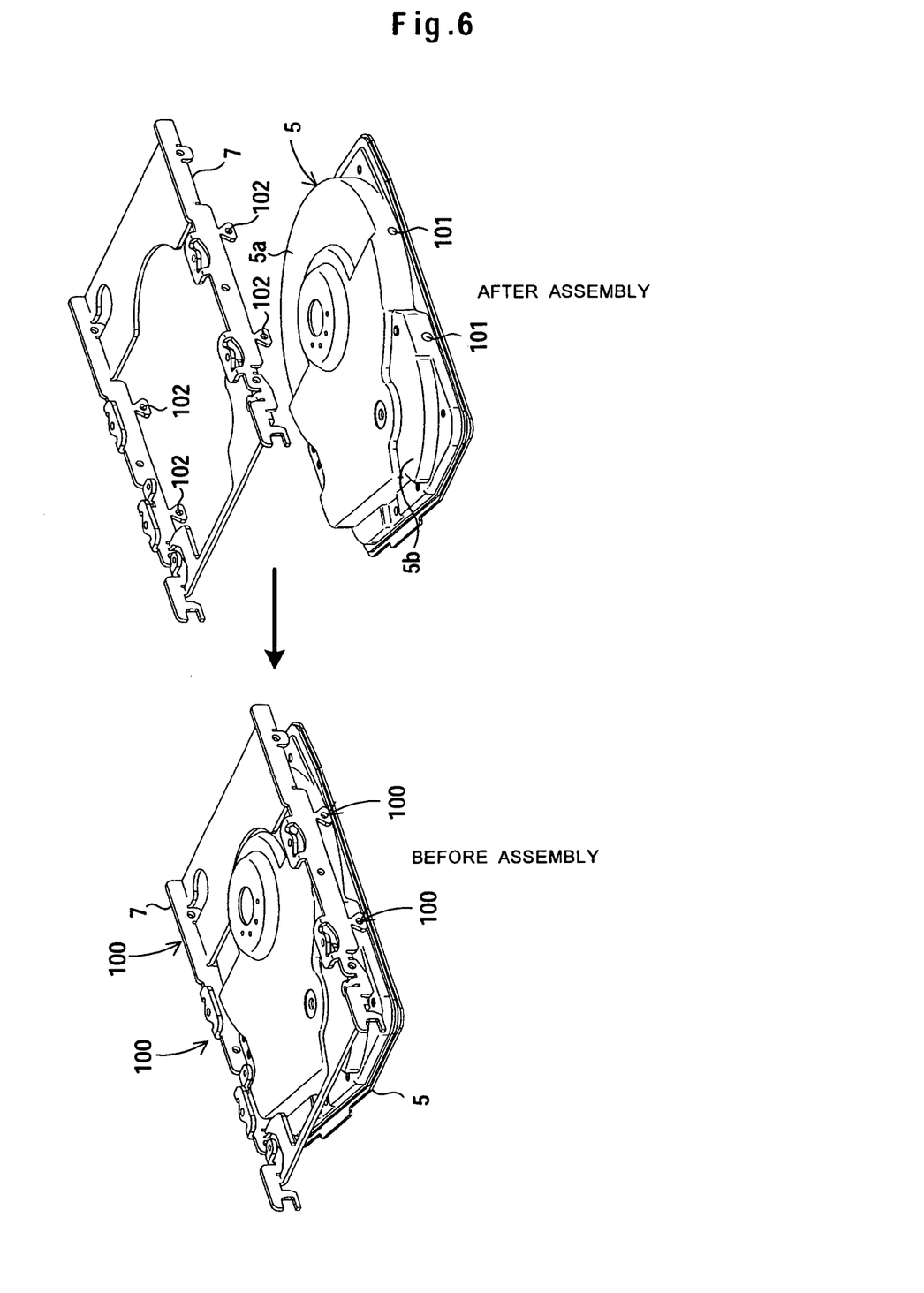
FIG. 6 is a perspective view showing another embodiment of the rotating disk storage device according to the invention.
Figure 7:
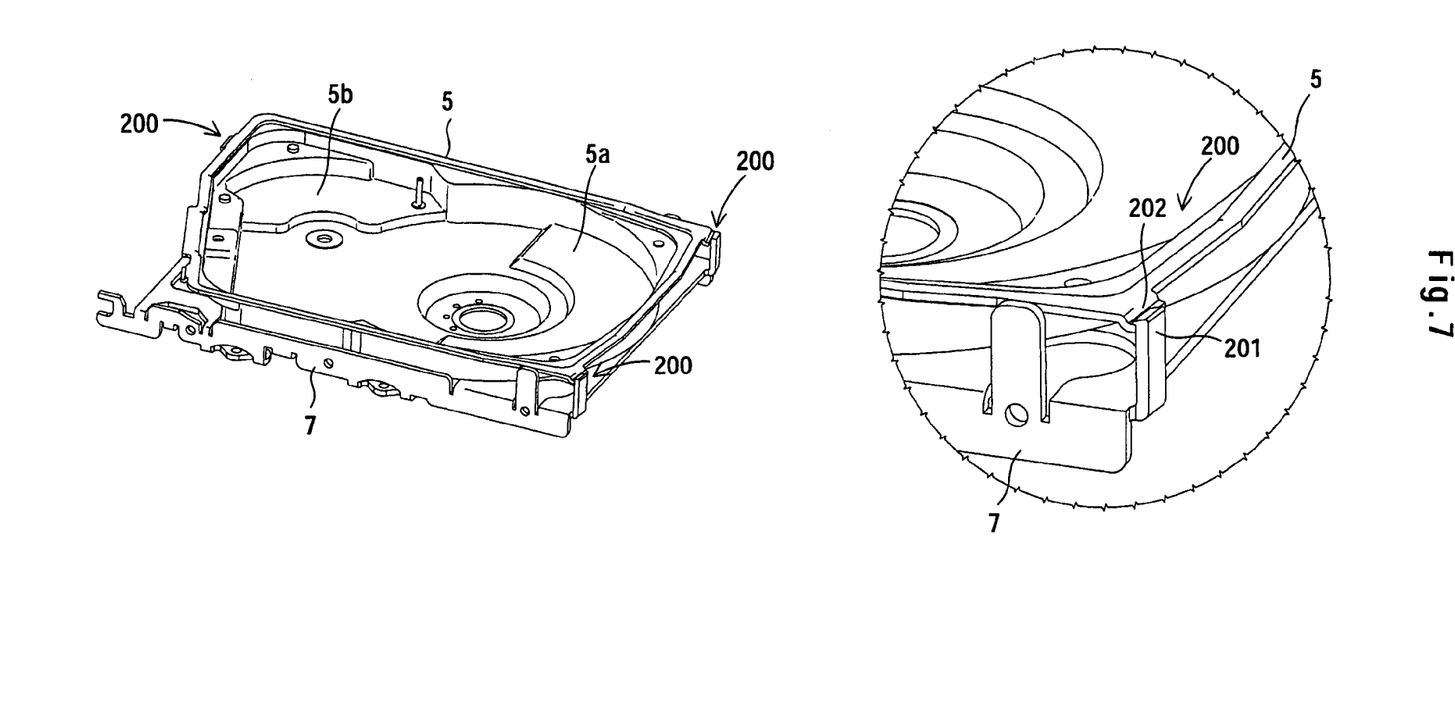
FIG. 7 is a perspective view showing another embodiment of the rotating disk storage device according to the invention.

Although the base and the frame are fixed to each other by the use of the adhesive double coated tape 9 which is the vibration damping material in the above embodiment, the fixing mechanism is not limited to the adhesive double coated tape 9, and other fixing means may be used. For example, a fitting structure 100 using projections and recesses as shown in FIG. 6, a hook structure 200 using claws as shown in FIG. 7, a clamping structure 300 shown in FIG. 8(a), a caulking structure 400 shown in FIG. 8(b), and a welding structure (not shown) may be employed.

The fitting structure 100 using projections and recesses is provided in a rim area at which the base 5 and the frame 7 are in contact with each other. Semispherical projections 101 are formed on the base, and the recesses 102 to which the projections 101 are fitted are formed on the frame. It is possible to fix the frame 7 to the base 5 by fitting the projections 101 to the recesses 102. The thus-constituted fitting structure 100 using projections and recesses enables the base 5 to be fixed in such a fashion that the frame 7 pinches the base 5 and is correctly positioned only by fitting the semispherical projections 101 of the base 5 to the recesses 102 of the frame 7. Thus, the positioning and the fixation of the frame 7 to the base 5 are readily achieved.

The hook structure 200 using claws is provided with claws 201 projected from a predetermined facet of, for example, the frame 7 and brackets 202 each of which is in the shape of a crevice formed on a predetermined facet of the base 5 in accordance with the positions of the claws. The claws 201 of the frame 7 are hooked on the depressed brackets 202 of the frame 5, so that the frame 7 is fixed to the base 5. With the thus-constituted hook structure 200 using claws, only by hooking the claws 201 of the frame 7 on the depressed brackets 202 of the base 5, the claws 201 of the frame 7 are engaged with the depressed brackets 202 of the base 5 to be hardly disengaged. Thus, the frame 7 is readily fixed and positioned to the base 5 only by the hooking operation.

Figure 8:
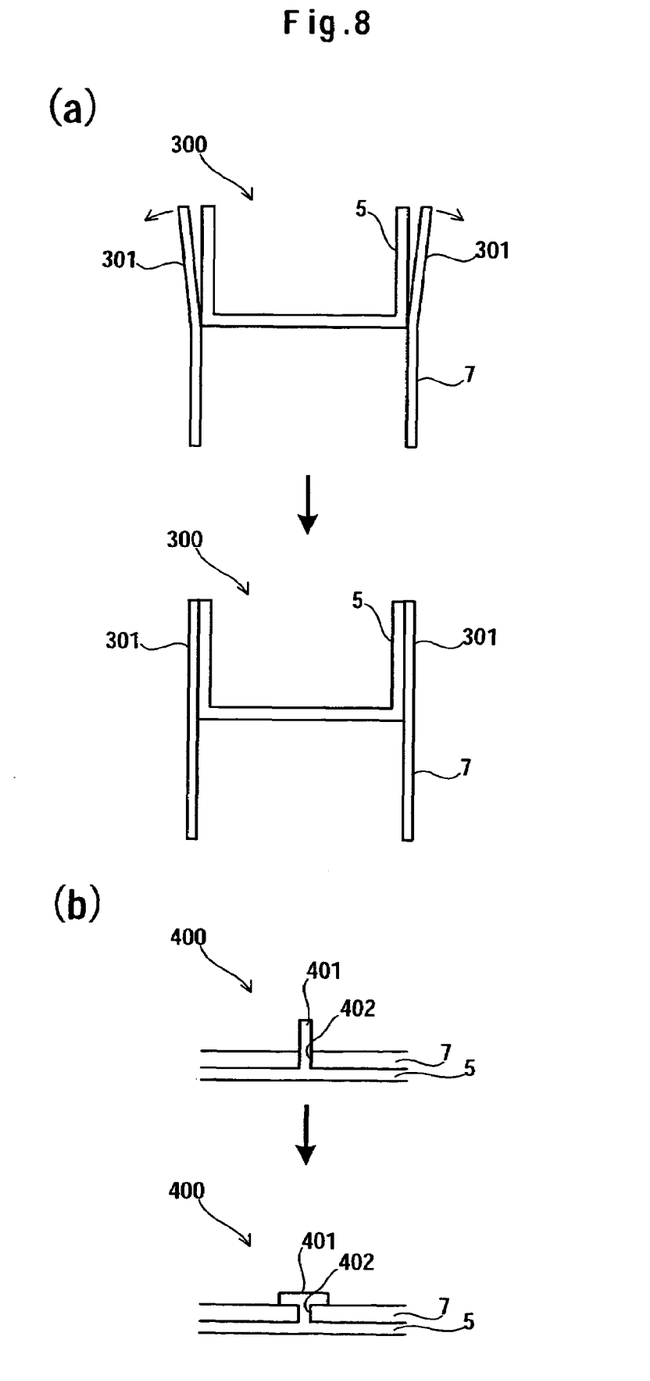

The clamping structure 300 is provided with pressure contact pieces 301 each of which is disposed on a predetermined facet serving as a rim of the frame 7. The pressure contact pieces 301 are opposed to each other and can be in pressure contact with predetermined portions serving as rims of the base 5. By imparting a claming function to the pressure contact pieces 301 using a steel plate having resilience for the pressure contact pieces 301, the frame 7 is fixed to the base 5. With the thus-constituted clamping structure 300, the pressure contact pieces 301 of the frame 7 clamp and fix the predetermined portions serving as the rims of the base 5 thanks to the resilience of the steel plate. Therefore, only by the clamping operation of clamping and fixing the base 5 by the frame 7, the frame 7 is readily fixed and positioned to the base 5.

The caulking structure 400 is provided in rim areas at which the base 5 and the frame 7 are in contact with each other. The caulking structure 400 is provided with a hub 401 formed on the base and a hole 402 formed on the frame for inserting therein the hub 401. After inserting the hub 401 of the base 5 in the hole 402 of the frame 7, the hub 401 of the base 5 projecting from the hole 402 of the frame 7 is caulked to fix the frame 7 to the base 5. With the thus-constituted caulking structure 400, the frame 7 is permanently fixed and positioned to the base 5.

In the welding structure, the base 5 and the frame 7 are fitted to each other followed by welding a predetermined portion to fix the base 5 and the frame 7 to each other. With the above welding structure, the frame 7 is permanently fixed and positioned to the base 5.

As described in the foregoing, when the base 5 and the frame 7 are not joined to each other by using the vibration damping material, the yoke area 7a of the frame 7 and the base 5 are brought into direct contact with each other. This means that no component exists between the yoke area 7a of the frame 7 and the base 5, so that a preferable magnetism is provided in view of the formation of the magnetic path of the VCM 8.

This invention is applicable to rotating disk storage devices having an actuator head suspension assembly.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A rotating disk storage device comprising:
a rotating disk recording medium;
a voice coil motor configured to drive a head suspension assembly having a head for reading data from the rotating disk recording medium;
a base that houses the rotating disk recording medium, the head suspension assembly, and the voice coil motor; a cover formed over the base; and
a frame having an adhesive vibration damping material positioned at a bottom area thereof and configured to directly join a bottom area of the base with the bottom area of the frame.

2. The rotating disk storage device according to claim 1, wherein the vibration damping material comprises an adhesive double coated tape.

3. The rotating disk storage device according to claim 1, wherein the vibration damping material comprises a rubber joined to the base and the frame using an adhesive.

4. The rotating disk storage device according to claim 1, wherein the vibration damping material comprises a polymeric material joined to the base and the frame using an adhesive.

5. The rotating disk storage device according to claim 1, wherein the frame is provided with an arm having a leaf spring structure for fitting and positioning to the base.

6. The rotating disk storage device according to claim 1, wherein the voice coil motor includes a voice coil rotating integrally with the head suspension assembly, and the frame is provided with a yoke area made from a steel plate, the yoke area including a projected area of a rotating range of the voice coil.

7. The rotating disk storage device according to claim 1, wherein the frame has a mounting structure for mounting to a host system.

8. A rotating disk storage device comprising:
a rotating disk recording medium;
a head suspension assembly provided with a head for reading data from the rotating disk recording medium;
a voice coil motor including a voice coil rotating integrally with the head suspension assembly and configured to drive the head suspension assembly;
a base made from a magnetic material, the base housing the rotating disk recording medium, the head suspension assembly, and the voice coil motor; a cover formed over the base; and
a frame provided with a yoke area including a projected area of a rotating range of the voice coil, the yoke area being made from a magnetic material, wherein the frame includes an adhesive vibration damping material for directly joining a bottom area of the base with a bottom area of the frame;
wherein the yoke area is in direct contact with the base.

9. The rotating disk storage device according to claim 8, wherein the base and the frame are joined to each other by the use of an adhesive double coated tape.

10. The rotating disk storage device according to claim 8, wherein the frame has a mounting structure for mounting to a host system.

* * * * *